(12) United States Patent
Menaskanian

(10) Patent No.: US 11,725,540 B1
(45) Date of Patent: Aug. 15, 2023

(54) ENERGY GENERATION SYSTEM

(71) Applicant: Valod Menaskanian, La Crescenta, CA (US)

(72) Inventor: Valod Menaskanian, La Crescenta, CA (US)

( * ) Notice: Subject to any disclaimer, the term of this patent is extended or adjusted under 35 U.S.C. 154(b) by 35 days.

(21) Appl. No.: 17/513,547

(22) Filed: Oct. 28, 2021

(51) Int. Cl.
  *F03D 9/34* (2016.01)
  *F01D 25/28* (2006.01)

(52) U.S. Cl.
  CPC .............. *F01D 25/28* (2013.01); *F03D 9/34* (2016.05)

(58) Field of Classification Search
  CPC ..... F03D 9/32; F03D 9/34; F03D 9/30; F03D 9/11; F03D 9/43; F03D 9/45; F03B 15/00; F05B 2240/90; F05B 2240/931
  See application file for complete search history.

(56) References Cited

U.S. PATENT DOCUMENTS

| | | | |
|---|---|---|---|
| 2015/0275865 A1* | 10/2015 | Marquardt | F03D 1/0633 290/55 |
| 2018/0135600 A1* | 5/2018 | Ezoory | F03D 3/005 |
| 2020/0191115 A1* | 6/2020 | Vail, Jr. | F03D 13/20 |
| 2020/0400118 A1* | 12/2020 | Tedaldi | F03D 9/45 |

* cited by examiner

*Primary Examiner* — David E Sosnowski
*Assistant Examiner* — Maxime M Adjagbe
(74) *Attorney, Agent, or Firm* — Plager Schack LLP; Mark H. Plager; Michael J. O'Brien

(57) ABSTRACT

An energy generation system, has a roof that is configured to rest upon a structure. A frame is joined to the roof with a mounting bracket. A turbine arranged in the frame with a first turbine shaft and a second turbine shaft. A first alternator is joined to the first turbine shaft with a first drive gear. A second alternator is joined to the second turbine shaft with a second drive gear. A switching system is joined to the first alternator and the second alternator. The switching system is programmed with a loop of instructions to determine a turbine rotational speed. Then, engage the first alternator. After that, monitor the turbine rotational speed. Following that, engage the second alternator.

2 Claims, 7 Drawing Sheets

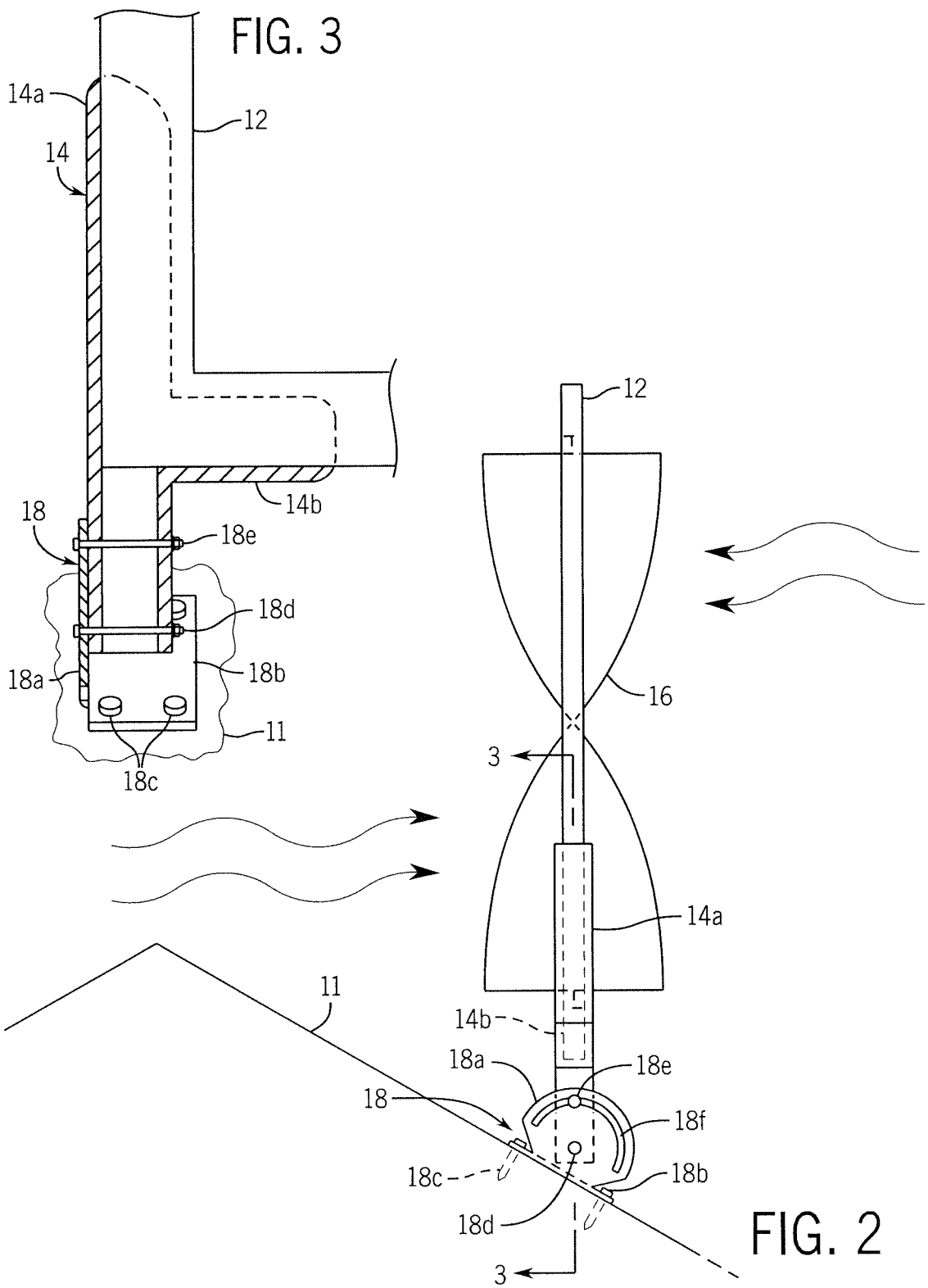

ENERGY GENERATION SYSTEM

BACKGROUND

The embodiments herein relate generally to energy generation systems.

Prior to embodiments of the disclosed invention, there were no systems that adapt to the ever changing wind velocity in order to maximize energy generation during both low and high wind speeds.

SUMMARY

An energy generation system has a roof that is configured to rest upon a structure. A frame is joined to the roof with a mounting bracket. A turbine arranged in the frame with a first turbine shaft and a second turbine shaft. A first alternator is joined to the first turbine shaft with a first drive gear. A second alternator is joined to the second turbine shaft with a second drive gear. A switching system is joined to the first alternator and the second alternator. The switching system is programmed with a loop of instructions to determine a turbine rotational speed. Then, engage the first alternator. After that, monitor the turbine rotational speed. Following that, engage the second alternator.

BRIEF DESCRIPTION OF THE FIGURES

The detailed description of some embodiments of the invention is made below with reference to the accompanying figures, wherein like numerals represent corresponding parts of the figures.

FIG. 2 shows a side elevation view of one embodiment of the present invention taken along line 2-2 in FIG. 1;

FIG. 3 shows a cross-sectional view of one embodiment of the present invention taken along line 3-3 in FIG. 2;

DETAILED DESCRIPTION OF CERTAIN EMBODIMENTS

Figure 1:
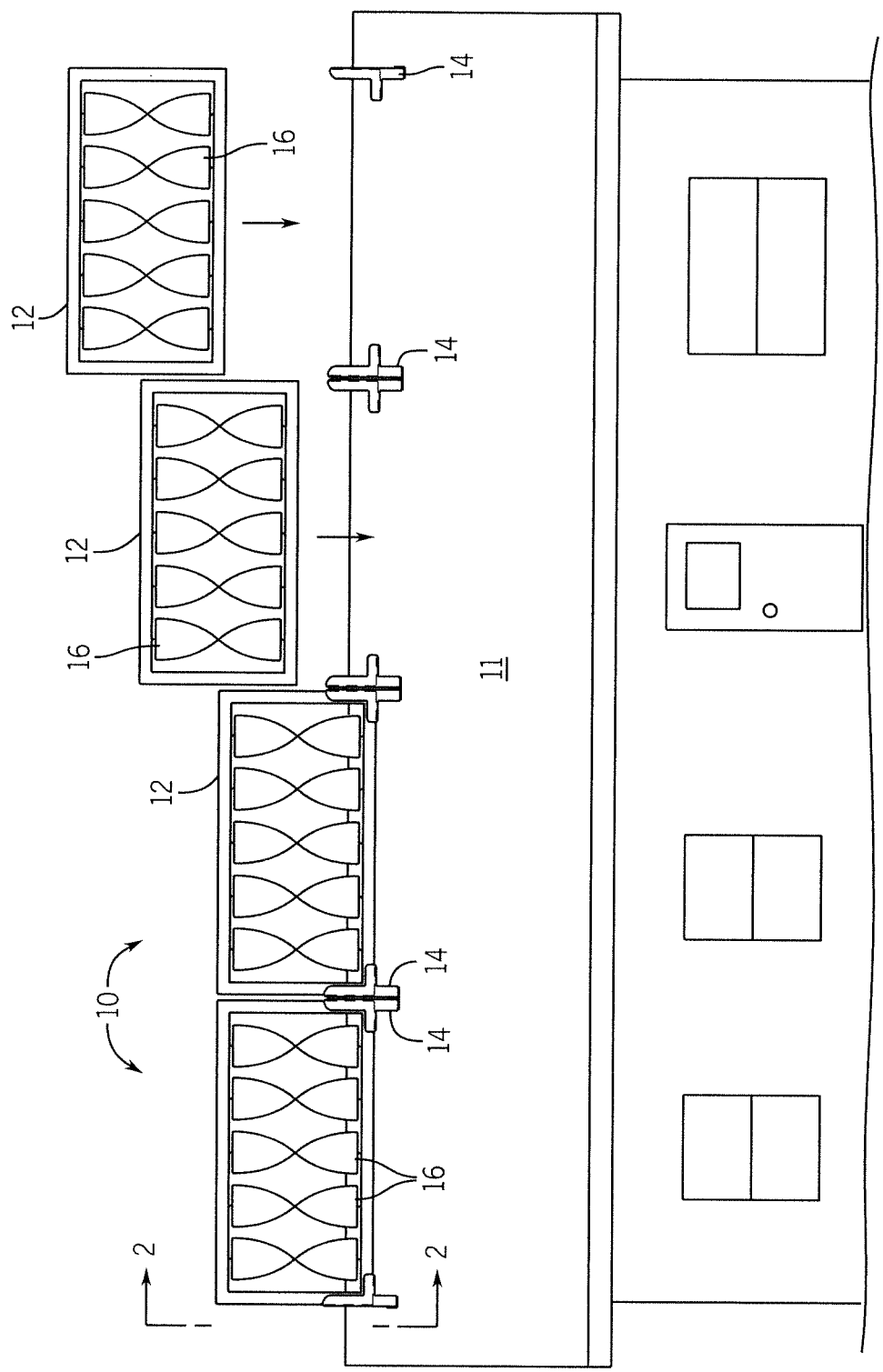
FIG. 1 shows a front elevation view of one embodiment of the present invention shown in use.
Figure 4:
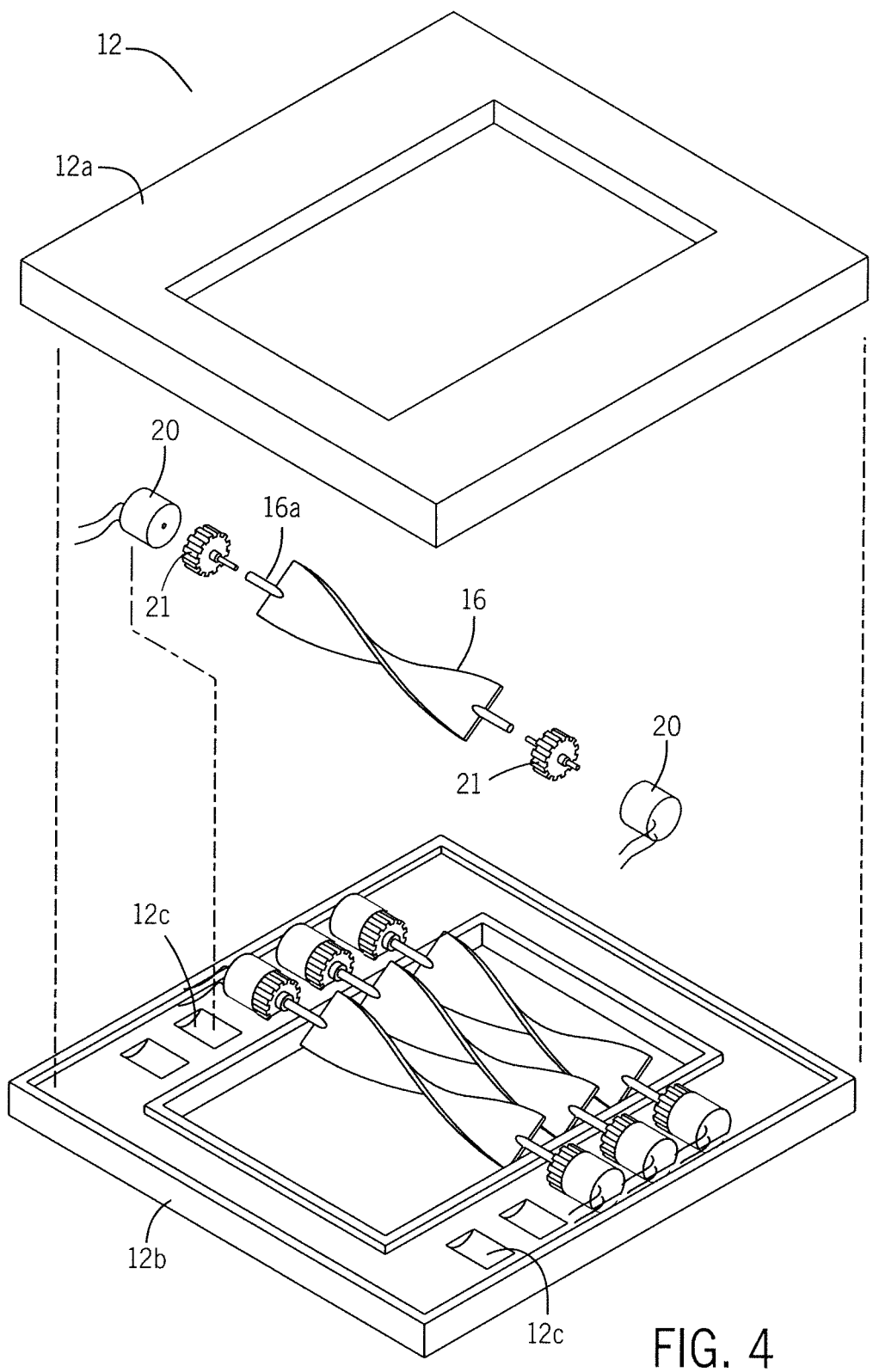
FIG. 4 shows an exploded perspective view of one embodiment of the present invention shown.
Figure 5:
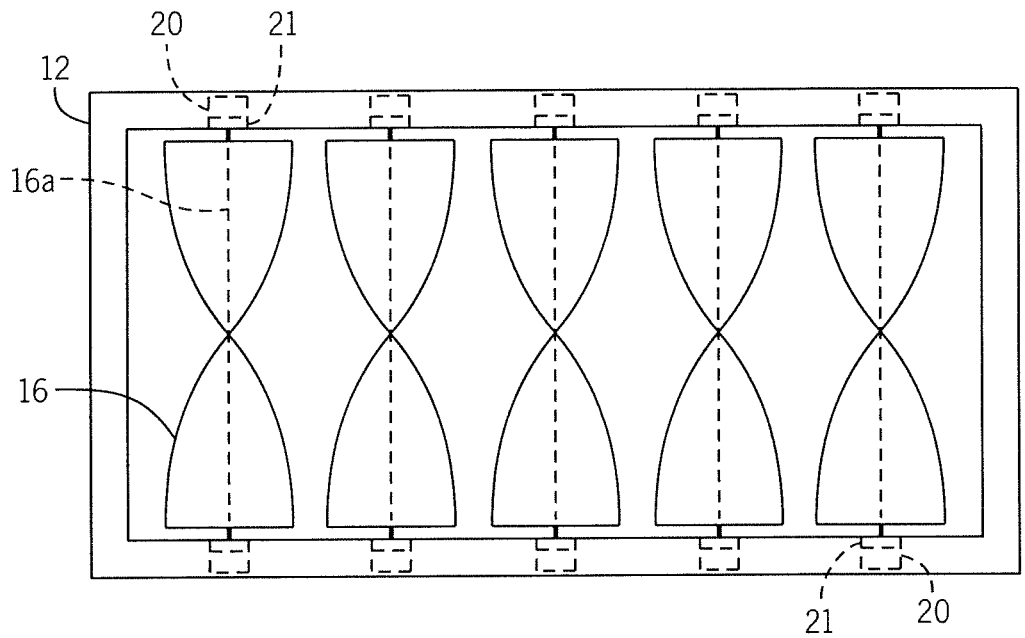
FIG. 5 shows a front elevation view of one embodiment of the present invention shown.
Figure 6:
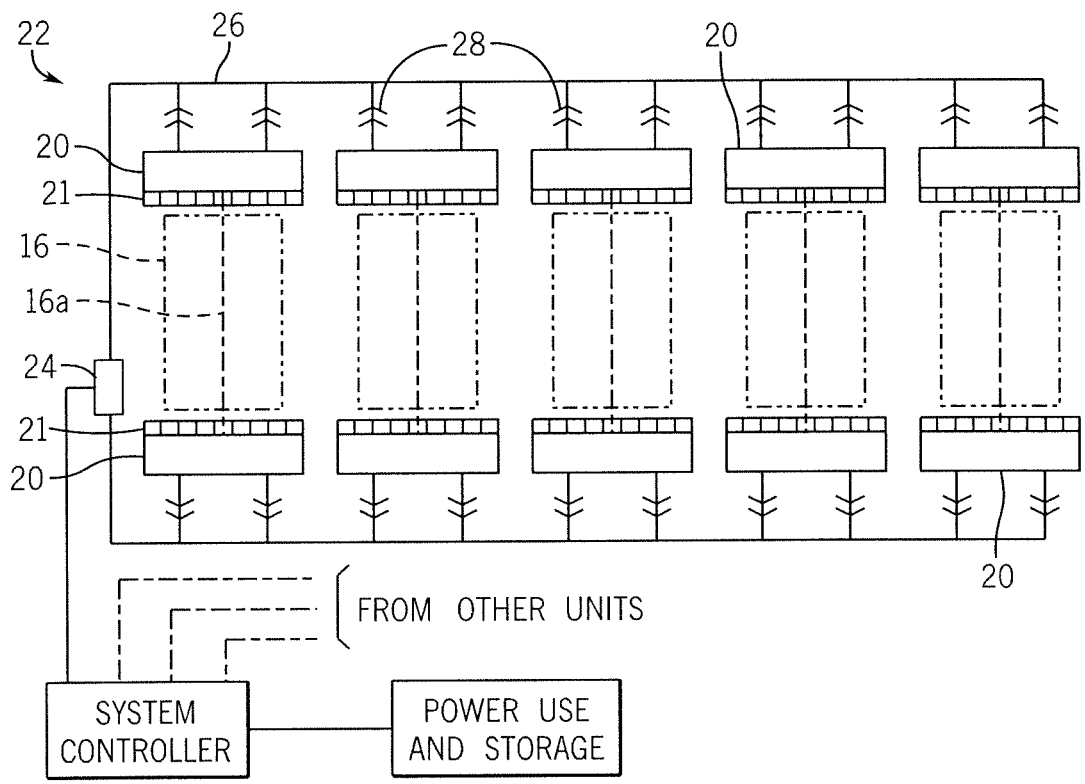
FIG. 6 shows a schematic of one embodiment of the present invention shown.
Figure 7:
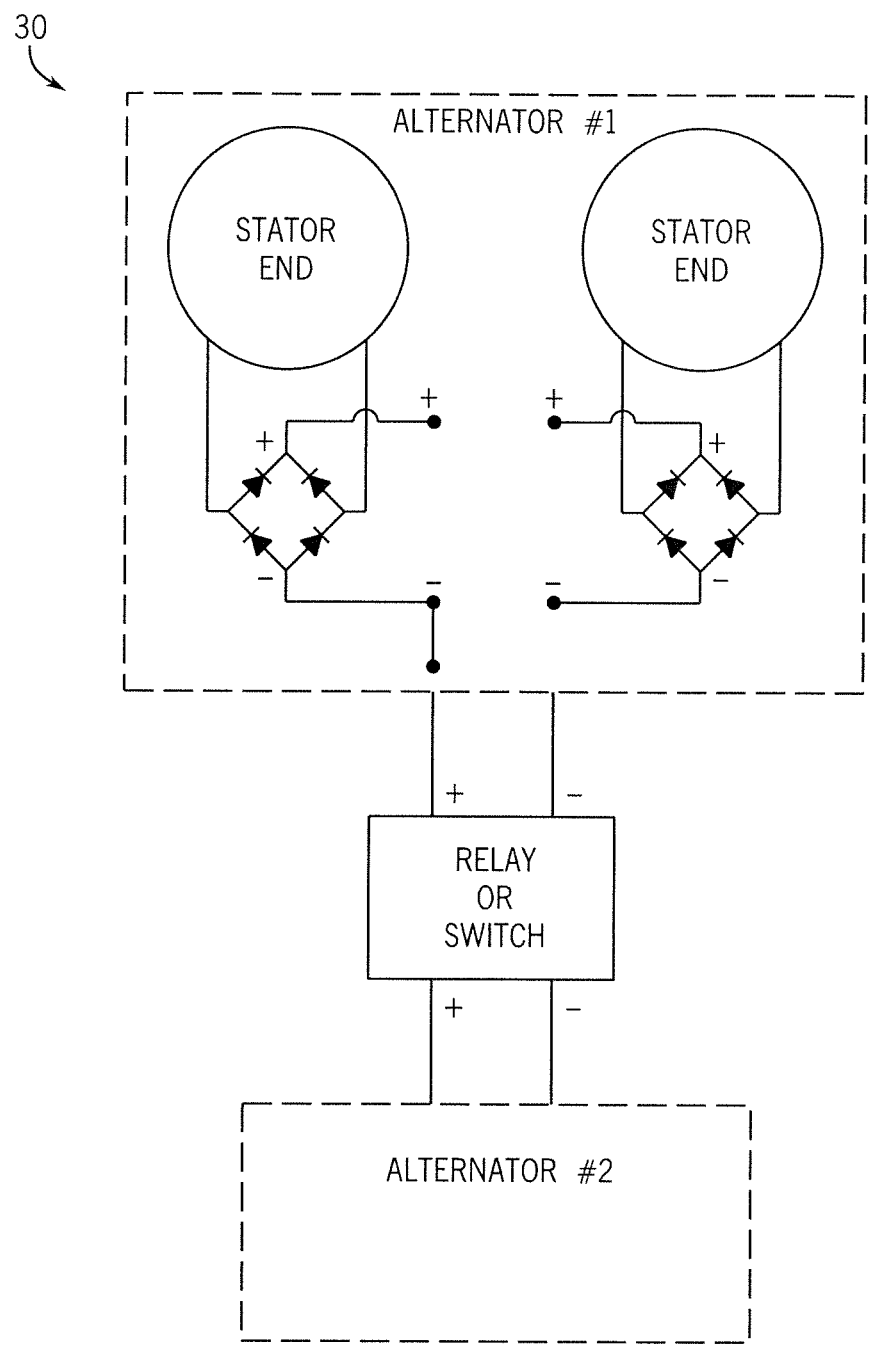
FIG. 7 shows an electrical diagram of one embodiment of the present invention shown.
Figure 8:
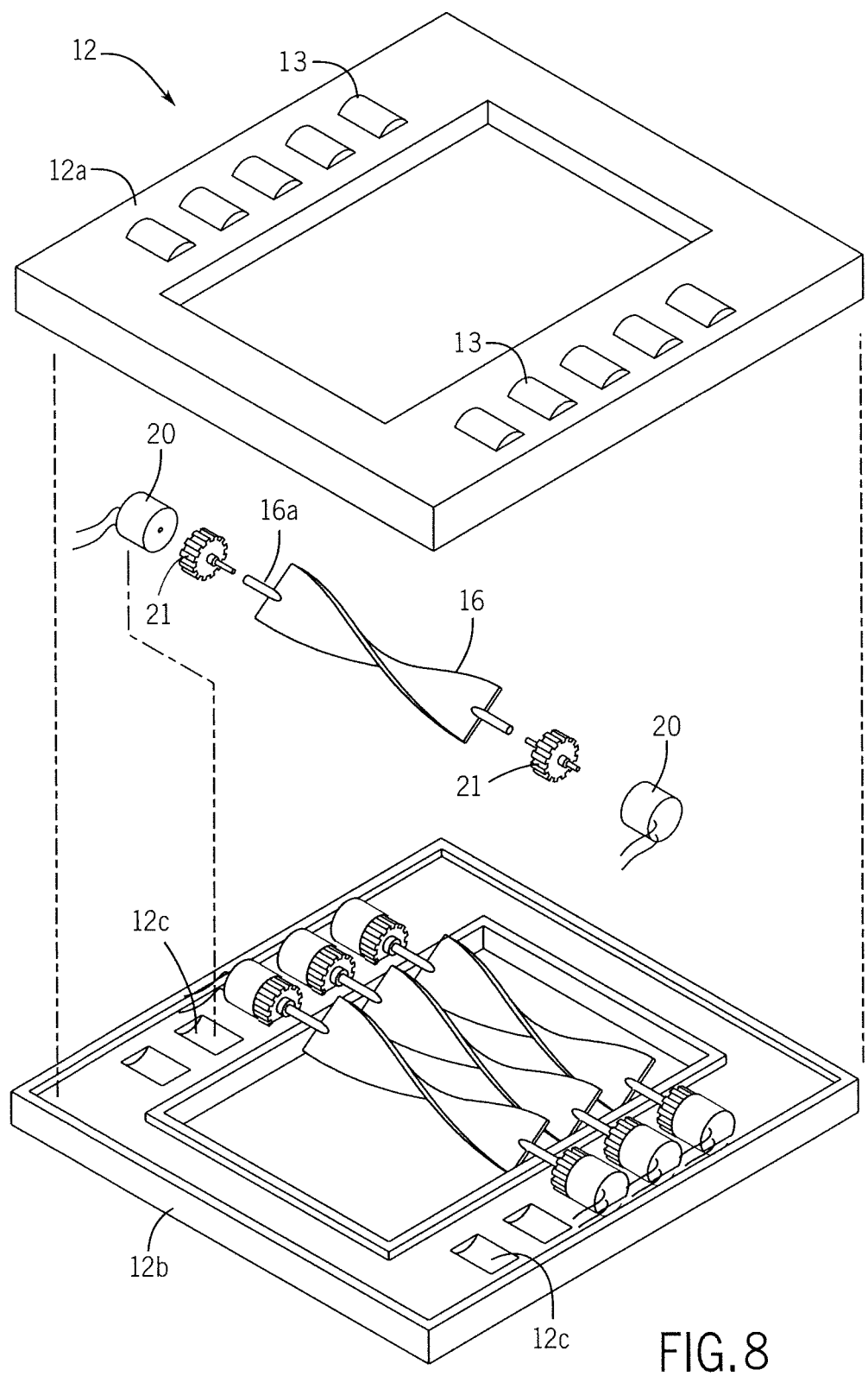
FIG. 8 shows an exploded perspective view of one embodiment of the present invention shown.
Figure 9:
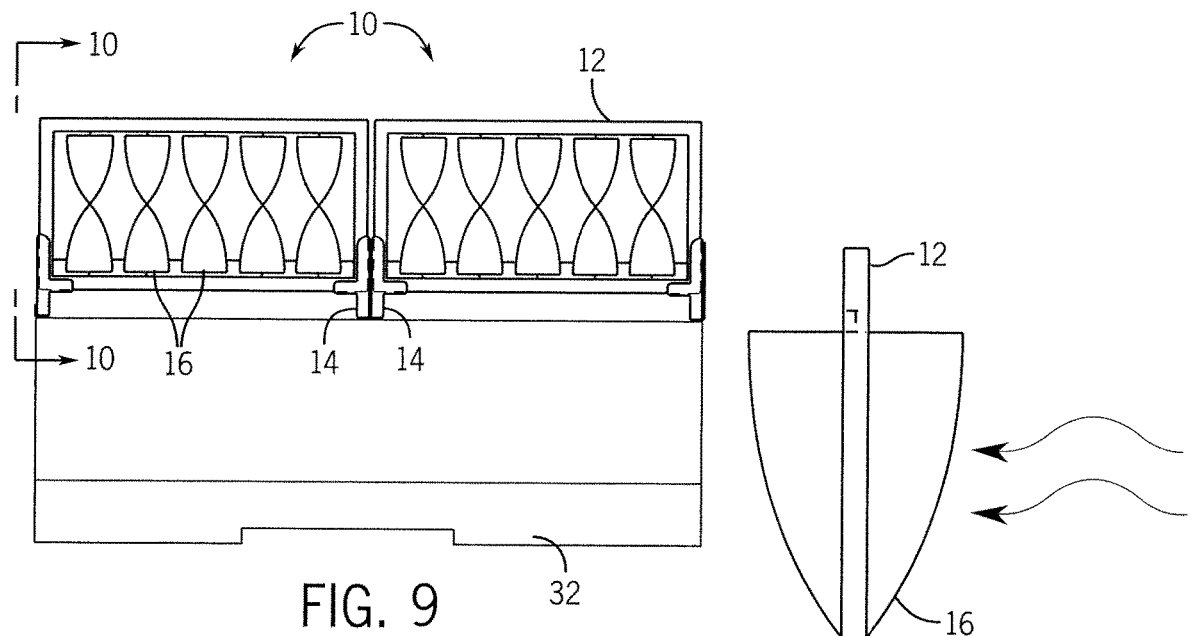
FIG. 9 shows a front elevation view of one embodiment of the present invention shown in use.
Figure 10:
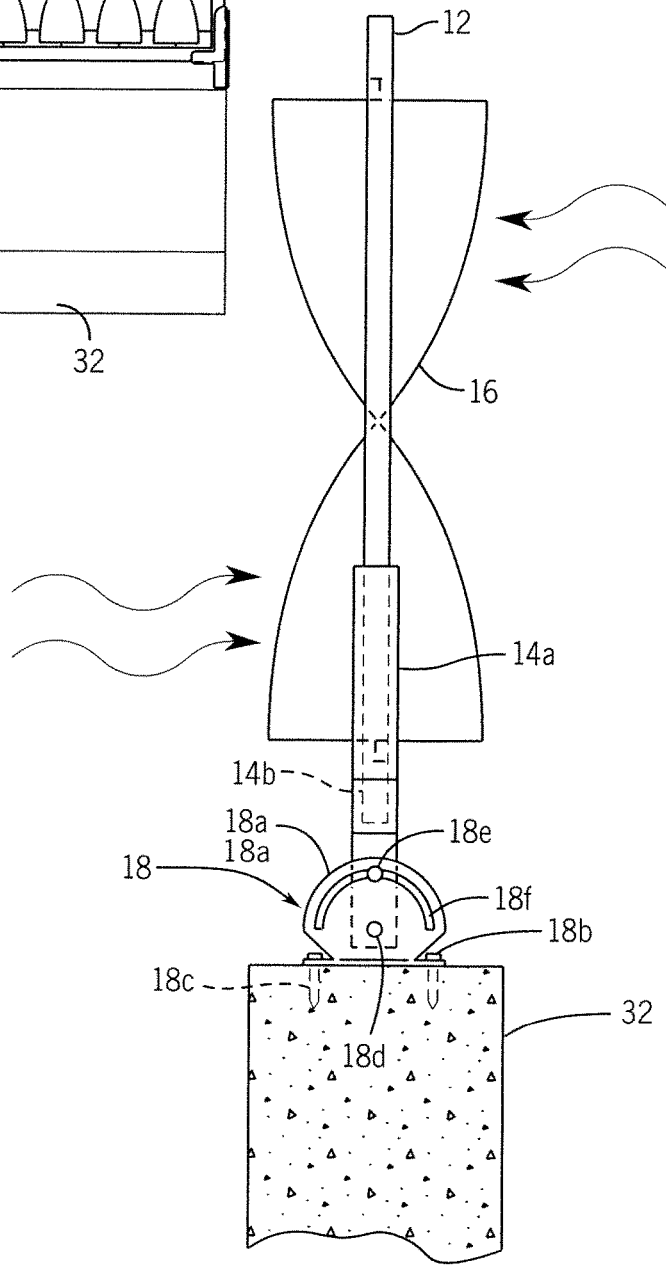
FIG. 10 shows a cross-sectional view of one embodiment of the present invention taken along line 10-10 in FIG. 9.

By way of example, and referring to FIGS. 1-10, one embodiment of an energy generation system 10 is used on a residential structure having a roof 11. The roof 11 is attached to a roof mounting bracket 18.

The roof mounting bracket 18 further comprises a vertical member 18a joined to a roof mounting member 18b. The roof mounting member 18b is attached to the roof 11 with mounting screws 18c. The vertical member 18a is attached to a mounting bracket 14. The vertical member 18a further comprises an arcuate opening 18f.

The mounting bracket 14 further comprises a vertical portion 14a joined to a horizontal portion 14b. The vertical portion 14a is attached to the vertical member 18a with a pivot bolt 18d and an adjustment bolt 18e. The adjustment bolt 18e fits through the arcuate opening 18f in order to set an angle of the mounting bracket 14 relative to the roof 11.

The mounting bracket 14 is attached to a frame 12 having a frame front side 12a, a frame rear side 12b, and a motor mounting recess 12c. A turbine 16 is arranged within the frame 12. The turbine is attached to a first turbine shaft 16a and a second turbine shaft 16a. The first turbine shaft 16a is attached to a first alternator 20 with a first drive gear 21. The second turbine shaft 16a is attached to a second alternator 20 with a second drive gear 21.

A series of alternators 20 are each attached to wires 26 with a pair of connectors 28. The wires 26 are attached to an outlet box 24. The outlet box 24 is attached to a system controller. The system controller is attached to a power use and storage system.

The first alternator has a first stator end that is electrically coupled to a positive terminal and a negative terminal. The positive terminal and the negative terminal are also attached to a second stator end.

The positive terminal and the negative terminal are attached to a relay or switch. The relay or switch is attached to a second alternator. The relay is programmed with instructions to monitor a turbine speed. If rotational speed is sufficient to accommodate a load, the relay engages the first alternator to direct a load to a destination. If rotational speed is even higher, a second alternator can be placed under load. Rotational speed can be monitored and alternators turned on and off as needed.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An energy generation system, further comprising:
   a roof, configured to rest upon a structure; a roof mounting bracket joined to the roof, and further comprising a vertical plate, joined to a roof mounting plate wherein the roof mounting plate is attached to the roof with mounting screws;
   a frame, joined to the roof with a mounting bracket; wherein the frame further comprises a frame front side, a frame back side, and a motor mount recess; wherein the mounting bracket further comprises a vertical portion and a horizontal portion;
   a turbine arranged in the frame with a first turbine shaft and a second turbine shaft;
   a first alternator, joined to the first turbine shaft with a first drive gear;
   a second alternator, joined to the second turbine shaft with a second drive gear;
   a switching system joined to the first alternator and the second alternator; wherein the switching system is programmed with a loop of instructions to:
   determine a turbine rotational speed;
   engage the first alternator when the turbine rotational speed is adequate to generate energy from the first alternator;
   monitor the turbine rotational speed; and
   engage the second alternator when the turbine rotational speed is adequate to generate energy from the first alternator and the second alternator.

2. The energy generation system, of claim 1, wherein the roof mounting bracket further comprises an adjustment bolt arranged in an arcuate slot; wherein the mounting bolt and the adjustment bolt allows a user to control an angle of the mounting bracket.

* * * * *